April 30, 1935.  J. GARZIA  1,999,926
SPAGHETTI AND MACARONI MACHINE
Filed Aug. 14, 1934
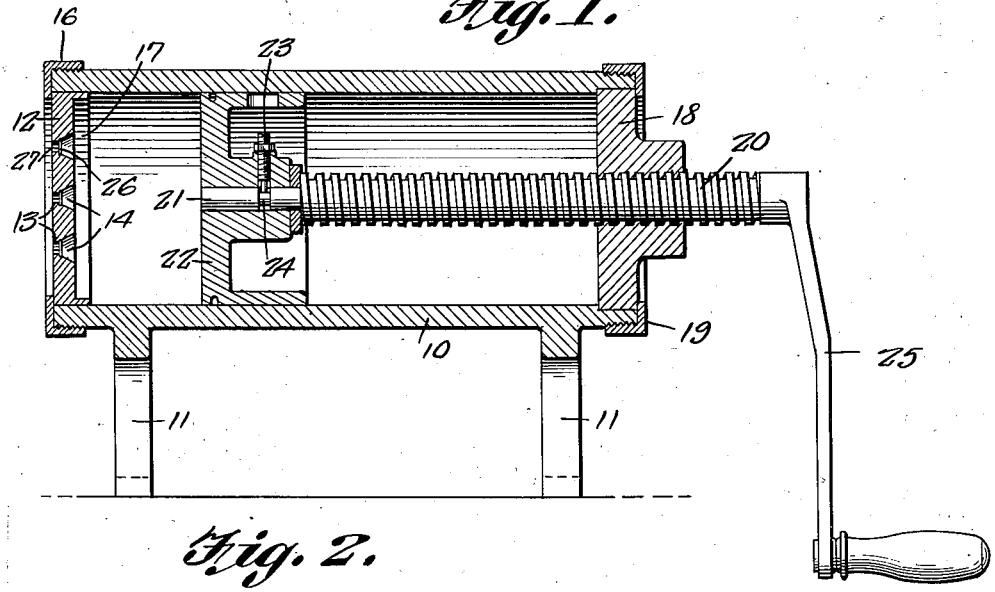
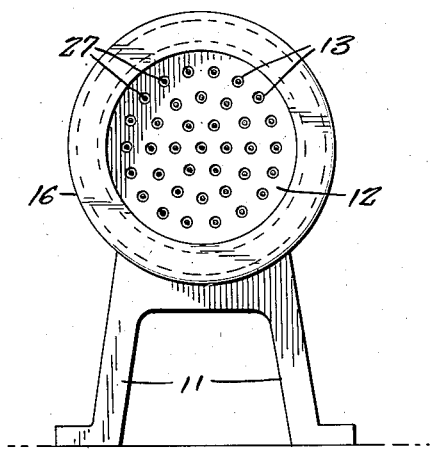
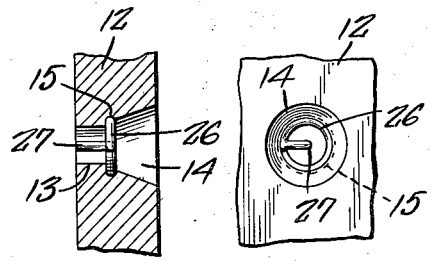
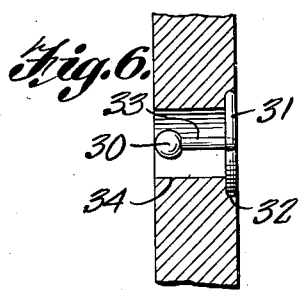
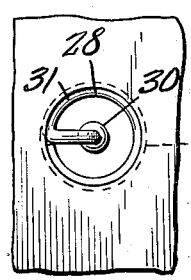
Joseph Garzia,
INVENTOR
BY Victor J. Evans & Co.
ATTORNEY
WITNESS:

Patented Apr. 30, 1935

1,999,926

UNITED STATES PATENT OFFICE 1,999,926

SPAGHETTI AND MACARONI MACHINE

Joseph Garzia, Philadelphia, Pa.

Application August 14, 1934, Serial No. 739,824

2 Claims. (Cl. 107—14)

The invention relates to a spaghetti and macaroni machine and more especially to a bladeless spaghetti and macaroni making machine.

The primary object of the invention is the provision of a machine of this character, wherein through the use of a piston and a die plate, dough can be readily and conveniently formed into macaroni or spaghetti, the piston being operated through the medium of a feed screw which is hand controlled.

Another object of the invention is the provision of a machine of this character, wherein the die plate has provided therein, at the discharge openings, seats for accommodating formers, these being adapted to operate upon dough delivered through the holes in the die plate for the creation of macaroni, the formers being of novel construction.

A further object of the invention is the provision of a machine of this character which is simple in construction, thoroughly reliable and efficient in its operation, readily portable, adaptable for home use, convenient for easy operation, strong, durable, readily and easily cleaned, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a vertical longitudinal sectional view through a machine constructed in accordance with the invention.

Figure 2 is an end elevation.

Figure 3 is an enlarged fragmentary vertical sectional view through a die plate for the machine, showing the mounting of a former therein.

Figure 4 is a face view thereof looking toward the inner face of the die plate.

Figure 5 is a perspective view of the former.

Figure 6 is a view similar to Figure 3 showing a slight modification.

Figure 7 is an inner face view thereof.

Similar reference characters indicate corresponding parts throughout the several views in the drawing.

Referring to the drawing in detail, the machine comprises a cylindrical body 10 open at opposite ends and supported upon uprights or legs 11 of any desirable construction. In one end of the body 10 is removably fitted a die plate 12 in the form of a disk having the circularly arranged spaced holes 13, each at its inner end being outwardly tapered, as at 14, and within this tapered portion is provided an annular channel or groove forming a seat 15 for a purpose presently described.

The disk 12 is held secure by a collar 16 telescoped over the body 10 and in threaded engagement therewith. The body, interiorly thereof, is formed with an annular rib 17 against which rests the disk 12 for the proper holding thereof when within the body 10.

The other end of the body 10 has fitted therein a head or cap 18, it being held in place by a collar 19 alike to the collar 16 and similarly fastened in place. Threaded centrally through the cap 18 is a feed screw 20 having the reduced inner end 21 for the fitting thereon of a piston or plunger 22 which is slidably fitted in the body 10 and is swiveled upon the reduced end 21 through the medium of the swivel pin or screw 23 fitting in a groove 24 in the feed screw 20. The feed screw 20, at its outer end, carries a crank handle 25 for manual manipulation in the operation of the machine.

Removably engaged in the annular seat 15 in each hole 13 is a former for the creating of macaroni of hollow kind and this former is made from a single length of stiff wire bent on itself to provide a base coil or hoop 26 and in one end portion of the wire there is bent an inwardly and outwardly directed pin 27, the outwardly directed portion being centered with respect to the hoop or coil 26, while the inwardly bent portion lies in the same plane with said hoop or coil, the hoop or coil 26 being inherently resilient, so that the same can be snapped into the annular seat 15 for the mounting of the former in the opening 13, as is clearly shown in Figures 3 and 4 of the drawing.

In Figures 6 and 7 of the drawing there is shown a slight modification of former, wherein this former 28 is alike to the previously described former excepting that the outwardly directed pin 29 has a free ball end 30 and the said former 28 at its hoop or coil 31 is snapped into a seat 32 provided in the die plate 33, the seat 32 being concentric of an opening or hole 34 in said plate and this hole or opening having a straight wall.

In the use of the machine, dough is placed within the body 10 ahead of the piston or follower 22 and on actuating the screw 20 the follower will press the dough mass through the holes or openings 13 in the die plate 12 and such dough in passing the formers will be operated upon to create hollow macaroni. On removal of the formers from the holes 13 the dough passing therethrough will be produced into solid macaroni.

The ball terminal 30, shown in Figures 6 and 7 of the drawing, of each former increases the hollow in the macaroni formation.

What is claimed is:

1. In a machine of the kind described, a cylindrical body, a die plate fitting one end of the body and having openings provided with annular groove-like seats, and formers, each having a circular inherently resilient base portion fitting the annular seats and a pin extension centrally of the base portion.

2. In a machine of the kind described, a cylindrical body, a die plate fitting one end of the body and having openings provided with annular groove-like seats, formers, each having a circular inherently resilient base portion fitting the annular seats and a pin extension centrally of the base portion, a piston working within the cylindrical body, a manually operable feed screw for said piston, and a ball terminal on the pin extension.

JOSEPH GARZIA.